United States Patent

[11] 3,633,837

[72] Inventors Hanjiro Esashi;
Tetsuo Machida, both of Miyagi-ken, Japan

[21] Appl. No. 842,595
[22] Filed July 17, 1969
[45] Patented Jan. 11, 1972
[73] Assignee Sony Corporation
Tokyo, Japan

[54] ENDLESS TAPE CARTRIDGE
12 Claims, 6 Drawing Figs.

[52] U.S. Cl. .......... 242/55.19A, 179/100.2 Z
[51] Int. Cl. .......... B65h 17/48
[50] Field of Search .......... 242/55.19 A, 55.19; 179/100.2 Z; 274/11 B, 4 B

[56] References Cited

UNITED STATES PATENTS

| | | | |
|---|---|---|---|
| 3,001,025 | 9/1961 | Gaubert | 179/100.2 |
| 3,030,041 | 4/1962 | Cousino | 242/55.19 A |
| 3,285,527 | 11/1966 | Cole, Jr. | 242/55.19 A |

FOREIGN PATENTS

| | | | |
|---|---|---|---|
| 1,286,306 | 1/1969 | Germany | 242/55.19 A |

*Primary Examiner*—Billy S. Taylor
*Attorney*—Hill, Sherman, Meroni, Gross & Simpson

ABSTRACT: An endless magnetic tape cartridge is formed of a top and bottom, each having a pair of openings, which are mutually aligned when the top and bottom are joined to define an oblong case with two through apertures positionable on a conventional two-shaft tape recording and reproducing device. An endless tape coil is carried in one end of the cartridge on a reel rotatable about one of the apertures while a pin at the other end of the cartridge pivotally mounts a sector-shaped plate which in turn rotatably mounts an auxiliary capstan and resiliently biased pinch roller. The auxiliary capstan has a toothed center opening to be driven by one shaft of the recorder while the reel idly turns about the other shaft of the recorder when the cartridge is placed in the device so that tape is withdrawn from the inner convolution of the tape coil past guide means, a magnetic head, a driving capstan, then between the auxiliary capstan and pinch roller to return to the outer convolution of the tape coil.

INVENTORS
HANJIRO ESASHI
TETSUO MACHIDA

BY Hill, Sherman, Meroni, Gross & Simpson ATTORNEYS

INVENTORS
HANJIRO ESASHI
TETSUO MACHIDA

BY Hill, Sherman, Meroni, Gross & Simpson ATTORNEYS

INVENTORS
HANJIRO ESASHI
TETSUO MACHIDA

BY Hill, Sherman, Meroni, Gross & Simpson
ATTORNEYS

ENDLESS TAPE CARTRIDGE

CROSS-REFERENCE TO RELATED APPLICATION

This invention is an improvement of the invention disclosed in the U.S. Pat. application, Ser. No. 691,324, filed Dec. 18, 1967 and now U.S. Pat. No. 3,559,908.

BACKGROUND OF THE INVENTION

1. Field of the Invention

This invention relates to an endless tape cartridge, and more particularly to an endless tape cartridge capable of fast forwarding of the tape.

2. Description of the Prior Art

Previously, a reel-to-reel-type tape cartridge the so-called Philips-type cassette has been widely used for magnetic recording and reproducing. This type of cartridge is small, light and easy to handle but an endless tape cartridge capable of fast forwarding of the tape has not been well known. One of the inventors has previously proposed an endless tape cartridge capable of fast forwarding described in the aforementioned U.S. application. The tape cartridge proposed therein has a drawback in that since one of hubs of the cartridge has no play, its mounting on a tape recorder is difficult and the pressure between the hub and a roller varies while in operation to cause changes in the tape drive speed or to generate noise.

Further, the endless tape is driven only in one direction and is badly damaged when driven in a reverse direction.

SUMMARY OF THE INVENTION

In accordance with the present invention an endless tape is wound on one hub of a reel-to-reel-type tape cartridge; one portion of the tape is driven by another hub and a roller pressed thereon; the hub and the roller are mounted on a common baseplate; and the baseplate is movably provided in the cartridge, thereby eliminating the defect experienced in the prior art. Further, the cartridge of this invention has one aperture for receiving the capstan of a magnetic recording and reproducing device so as to ensure correct loading of the cartridge on the device.

Accordingly, one object of this invention is to provide an endless tape cartridge which is simple in construction and is easy to assemble.

Another object of this invention is to provide an endless tape cartridge which is easy to load on a magnetic reproducing device and facilitates tape transportation.

A further object of this invention is to provide an endless tape cartridge which is capable of fast forwarding of the tape and is of low noise.

Still a further object of this invention is to provide an endless tape cartridge which is designed not to be mounted upside down on a magnetic reproducing device and not to damage the tape.

Other objects, features and advantages of this invention will become apparent from the following description taken in conjunction with the accompanying drawings.

DESCRIPTION OF THE PREFERRED EMBODIMENTS

Figure 1:
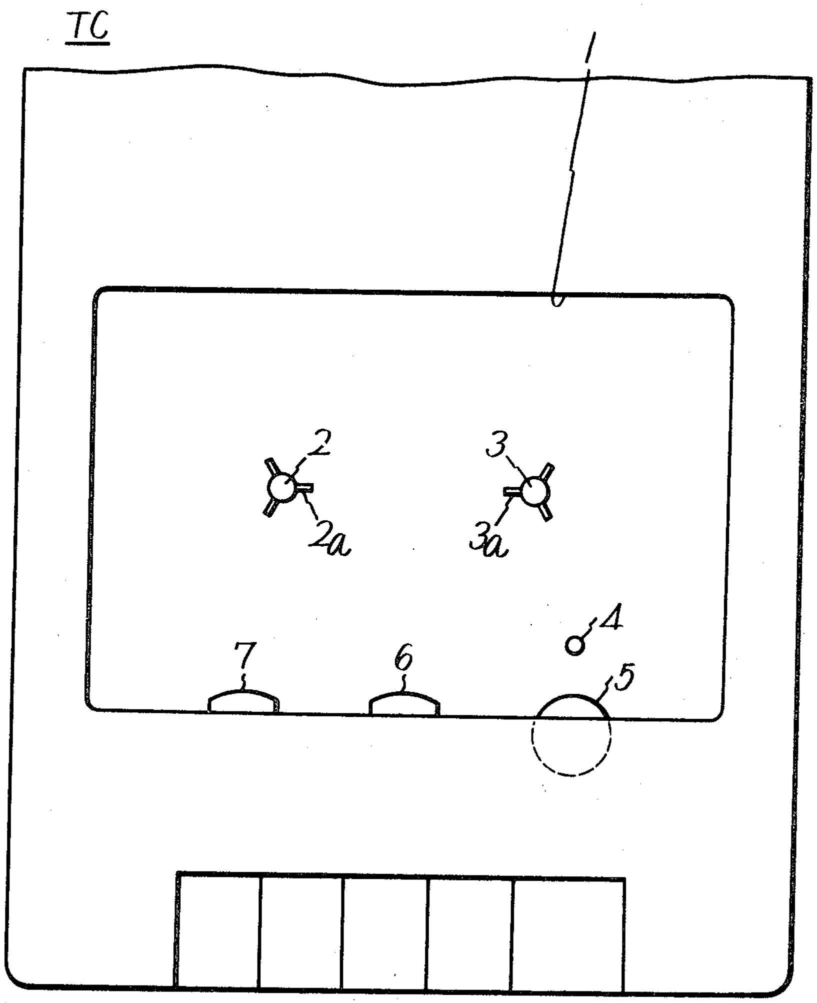
FIG. 1 is a plan view schematically illustrating one example of a cartridge-type tape recorder for use with a tape cartridge of this invention.

In FIG. 1 there is illustrated a magnetic recording and reproducing device TC (hereinafter referred to as a tape recorder) for use with usual reel-to-reel-type tape cartridges. The tape recorder TC is provided on its tape cartridge loading portion 1 with a reel shaft 2 serving as a supply reel shaft and another reel shaft 3 serving as a takeup reel shaft during recording and reproducing. Further, the tape recorder TC has a capstan 4 and a pinch roller 5 for driving a magnetic tape of a tape cartridge at a constant speed. Reference numerals 6 and 7 indicate a recording and reproducing magnetic head and an erasing magnetic head.

Figure 2:
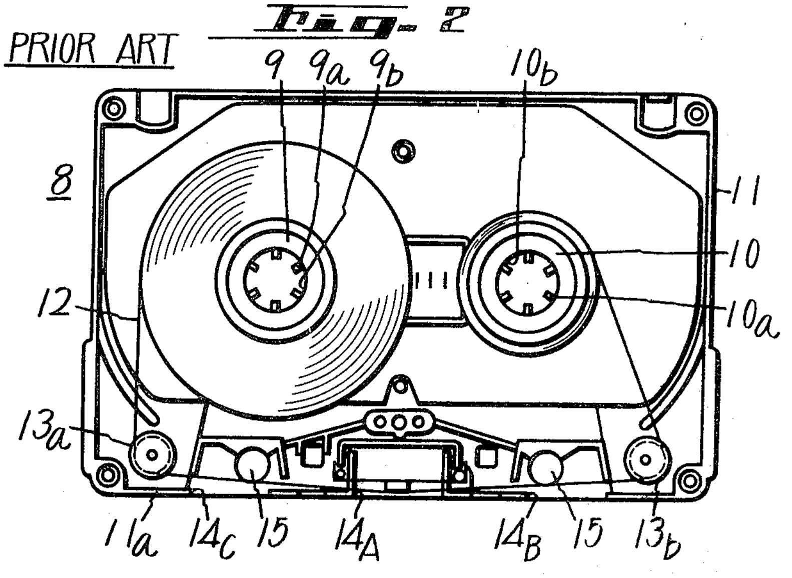
Fig. 2 PRIOR ART
FIG. 2 is a plan view schematically showing one example of a prior art type reel-to-reel tape cartridge with its cover removed.
Figure 3:
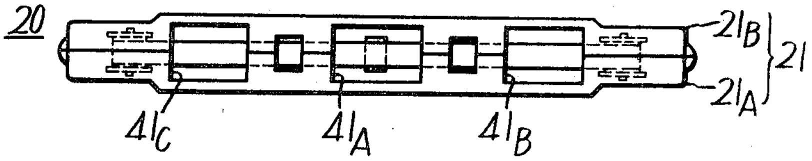
FIG. 3 is a front view of the endless tape cartridge of this invention.

In FIG. 2 reference numeral 8 generally indicates a usual reel-to-reel-type tape cartridge 8 for use with the tape recorder TC. The cartridge 8 is a case 11 of a substantially flat configuration, and is formed of upper and bottom case members. The tape cartridge 8 has rotatably mounted therein a pair of reels 9 and 10. Each reel 9 and 10 has a central aperture *9b* and *10b* and teeth *9a* and *9b* projecting into the openings for engagement with projecting teeth lugs *2a* and *3a* of the reel shafts 2 and 3 of the tape recorder TC. A tape 12 is stretched between the reels 9 and 10.

The case 11 has windows 14A, 14B and 14C formed in one side *11a*, through which a recording and reproducing magnetic head 6, a pinch roller 5 and an erasing head 7 are urged into contact with the tape 12. Further, tape guide rollers *13a* and *13b* are mounted in the case 11 on its front side near the corners and the tape 12 stretched between the reels 9 and 10 travels across the guide rollers *13a* and *13b* and the windows 14A, 14B and 14C. Apertures 15 are bisymmetrically formed in the upper and bottom case members of the cartridge 8, through which a capstan 4 of the tape recorder TC is received.

In actual use the tape cartridge 8 is mounted on the tape recorder TC on its cartridge loading portion 1 with the reel shafts 2 and 3 being received into the apertures *9b* and *10b* of the reels 9 and 10 respectively and with the capstan 4 being received into one of the apertures 15. When the tape recorder TC is put in its recording or reproducing condition, the magnetic heads 6 and 7 are urged into contact with the tape 12 through the windows 14A and 14C of the tape cartridge 8 and the pinch roller 5 is also brought into contact with the capstan 4 through the window 14B with the tape 12 gripped therebetween. Under such conditions, the tape 12 is driven at a constant speed for recording or reproducing in a known manner.

When the tape recorder TC is altered to its tape fast forwarding condition, the pinch roller 5 is disengaged from the capstan 4 and the reel shaft 3 is driven in a counterclockwise direction. Since the projecting teeth lugs *3a* of the reel shaft 3 are in engagement with the teeth *10a* of the reel 10, the reel 10 is driven in the counterclockwise direction relative to FIG. 2 to wind thereon the tape 12 at a high speed. During rewinding of the tape 12 the reel shaft 2 is driven in a clockwise direction and since the projecting teeth lugs *2a* of the reel shaft 2 mate with the teeth *9a* of the reel 9, the reel 9 is driven in the clockwise direction to rewind thereon the tape 12 at a high speed. Since the tape cartridge 8 is constructed bisymmetrically, the tape 12 can be driven in both directions by mounting the cartridge on the tape recorder TC upside down.

This invention deals with an endless tape cartridge which is capable of recording and reproducing in an endless manner when used with the cartridge-type magnetic recording and reproducing device designed for use with the reel-to-reel-type tape cartridge described above.

Referring now to FIGS. 3 to 6, the endless tape cartridge of this invention will hereinafter be described in detail. In the figures reference numeral 20 generally indicates the endless tape cartridge of this invention.

In the present invention a case 21 is formed of, for example, upper and bottom case members 21B and 21A and an aperture 24 is formed through the members 21A and 21B and positioned to align with a reel shaft 2 of the tape recorder TC. The aperture 24 has no teeth and merely receives the reel shaft. A reel 22 having wound thereon an endless tape 23 is rotatably mounted in the tape cartridge 20 about the aperture. In this case the endless tape 23 is drawn out from the innermost convolution of the tape winding and is wound on the outermost convolution. For mounting the reel 22 in the cartridge 20, an annular projection 25 is formed on the inside of the bottom case member 21A about the aperture 24 which loosely engages with the reel shaft 2 of the tape recorder TC, while a boss 22*a* having a central aperture for loose engagement with the annular projection 25 is formed on the reel 22 about its center. The annular projection 25 engages the outer periphery of the reel 22 to hold it rotatably in position. In this case an annular member 50 made of, for example, Teflon (Registered Trademark) is provided between the annular projection 25 and the boss 22*a* of the reel 22 so as to facilitate smooth rotation of them.

Further, an auxiliary capstan 26 and an auxiliary pinch roller 27 pressed into rotating contact therewith, which are mounted on a common baseplate 28, are mounted in the cartridge 20 pivotally upon shaft planted substantially parallel with the axis of the reel 22 in such a manner that a central aperture 33*b* of the auxiliary capstan 26 is positioned to align with a reel shaft 3 of the tape recorder TC. To this end, an annular projection 32 having a central aperture 31 for loosely engaging the reel shaft 3 is planted on the baseplate 28 and a boss 33 for engagement with the annular projection 32 is provided in the auxiliary capstan 26 at its center, and the auxiliary capstan 26 is pivotally mounted in the cartridge 20 by the engagement of the annular projection 32 and the boss 33. The central aperture 33*b* of the auxiliary capstan 26 has teeth 33*a* projecting into the opening for engagement with projecting teeth lugs 3*a* of the reel shaft 3 to permit the capstan 26 to be driven by the reel shaft 3 when mounted on the tape recorder TC. It is preferred to wrap a frictional member 29 as of rubber or the like on the outer periphery of the capstan 29.

The pinch roller 27 is biased so as to be resiliently pressed against the auxiliary capstan 26 at all times. The bottom case member 21A has an aperture 30 formed at a place corresponding to the reel shaft 3, through which the reel shaft 3 is inserted into the central aperture 33*b* of the capstan 26.

The baseplate 28 is generally, for example, sector shaped and has a resilient arm 36 formed integrally therewith and the arm 36 has a semicircular portion 28A at its free end. The pinch roller is pivotally mounted on a pin 37 planted on the semicircular portion 28A. In this case the arm 36 is in a bandlike form and is arranged so that its plane lies in a vertical direction, that is, in the axial direction of the reel 22, and the arm 36 is so biased as to press the auxiliary pinch roller 27 into contact with the auxiliary capstan 26 at all times. Further, the baseplate 28 is provided with means for adjusting the position of the auxiliary capstan 26 whose aperture 33*b* always lies at a position corresponding to the aperture 30 of the bottom case member 21A. For this purpose, a sleeve 34 is formed, for example, at the pivot of the baseplate 28 and a pin 35 having an outer diameter substantially smaller than the inner diameter of the sleeve 34 is planted on the bottom case member 21A for loose engagement with the sleeve 34 with a predetermined gap *g* therebetween. The bottom case member 21A has formed therein a recessed portion 39 on which the baseplate 28 is loosely mounted and the recessed portion 39 has sidewalls 39A and 39B which respectively abut with an outer side edge 28*a* of the baseplate 28 and the arm 36. In this case a predetermined gap G is provided between the outer side edge 28*a* of the baseplate 28 and the sidewall 39A of the recessed portion 39 or between the arm 36 and the sidewall 39B of the recessed portion 39. The baseplate 28 can be formed by molding from a resin integrally with the semicircular portion 28A of the arm and the sleeve 34.

The case 21 has at least three windows 41A, 41B and 41C formed in its front side for receiving a recording and reproducing magnetic head 6, a pinch roller 5 and an erasing head 7.

The tape 23 pulled out from the innermost winding of the tape on the reel 22 is drawn across the windows 41A, 41B, and 41C and between the auxiliary capstan 26 and the auxiliary pinch roller 27 and is then taken up on the outermost winding of the tape. To this end, tape guide rollers 42 and 43 are provided in the cartridge 20 at its front side near the corners. It is preferred to form the roller 42 in an inverted conical shape such that its diameter gradually reduces as its bottom is approached. The tape 23 drawn out from the reel 22 is guided to the guide roller 42 passing on the tape winding on the reel 22, so that the tape 23 runs to the roller 42 while being turned up to lie in a plane crossing the axial direction of the reel 22 on the tape winding. The tape 23 is turned down to lie in the axial direction of the reel 22 immediately before running across the windows 41A, 41B and 41C. Since the tape guide roller 42 is of such an inverted conical shape as previously referred to, the tape 23 trained around it does not disengage therefrom and can be smoothly transported over the conical surface of the guide roller 42.

Figure 4:
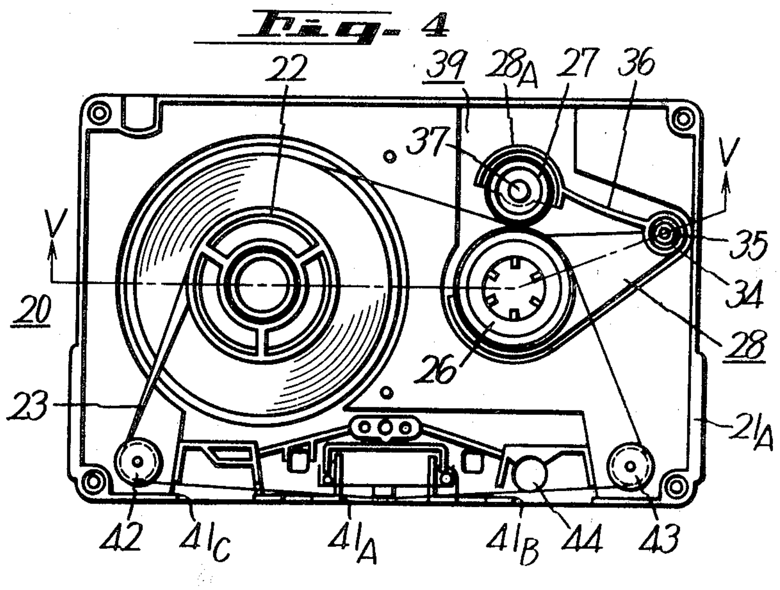
FIG. 4 is a plan view schematically showing the tape cartridge of FIG. 3 with its cover removed.
Figure 5:
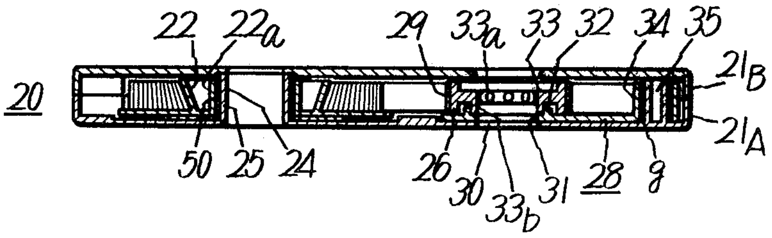
FIG. 5 is a cross-sectional view taken along the line V—V in FIG. 4.
Figure 6:
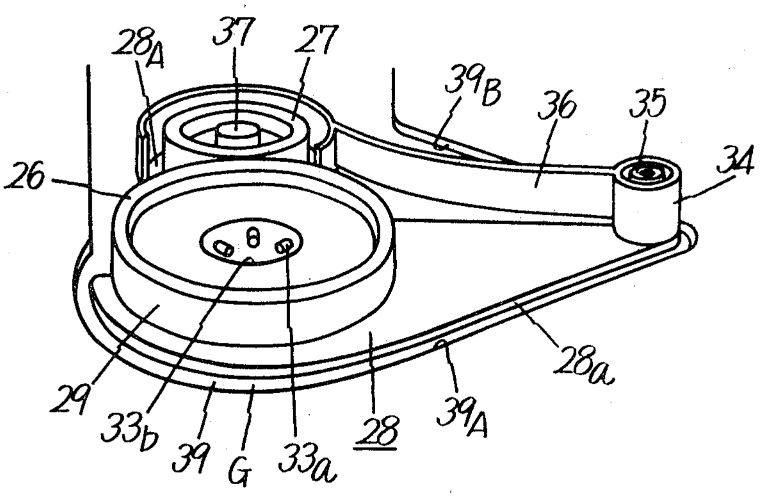
FIG. 6 is an enlarged perspective view illustrating the principal part of the cartridge exemplified in FIG. 4.

Further, one aperture 44 for receiving the capstan 4 is formed in the case 21 at a place opposite the window 41B, as shown in FIG. 4, that is, the aperture 44 is located further to the right than the center of the case 21 in the sheet of the drawing.

In actual use the tape cartridge 20 is mounted on the tape recorder TC with the reel shaft 2 being loosely received into the aperture 24 of the reel 22, with the reel shaft 3 being received the aperture 33*b* of the auxiliary capstan 26 through the aperture 30 of the case 21 and the aperture 31 of the baseplate 28 and with the capstan 4 being received into the aperture 44. Thus, since the teeth 33*a* of the auxiliary capstan 26 engage the projecting teeth lugs 3*a* of the reel shaft 3, the reel shaft 3 and the auxiliary capstan 26 are driven together. In this case the auxiliary capstan 26 is movable together with the baseplate 28 relative to the case 21, so that the engagement of the reel shaft 3 with the aperture 33*b*, that is, mounting of the tape cartridge 20 on the tape recorder TC can be achieved with ease.

When the tape recorder TC is put in its recording and reproducing condition, the pinch roller 5 is urged into contact with the capstan 4 with the tape 23 gripped therebetween to drive it, with the result that the tape 23 pulled out from the reel 22, is drawn across the guide roller 42 and between the auxiliary capstan 26 and the auxiliary pinch roller 27 and is then taken up on the outermost convolution of the tape on the reel 22. In this case the tape 23 is driven at a constant speed by the cooperation of the capstan 4 and the pinch roller 5 but since the reel shaft 3 is engaged with the auxiliary capstan 26, the tape 23 is driven by the cooperation of the auxiliary capstan 26 and the auxiliary pinch roller 27, too. However, a slip mechanism is interposed between the reel shaft 3 and a drive source therefor, so that the constant-speed drive of the tape 23 is achieved with the capstan 4 and the pinch roller 5 of the tape recorder TC. When the tape recorder TC is altered to its fast forwarding condition, the pinch roller 5 is disengaged from the capstan 4 and accordingly the constant-speed tape drive is not effected and only the reel shaft 3 is driven to drive the auxiliary capstan 26. Accordingly, suitable selection of the diameter of the auxiliary capstan 26 enables fast forwarding of the tape 23. Further, during rewinding of the tape the reel shaft 3 is not driven and only the reel shaft 2 is driven but since the reel shaft 2 is not engaged with the reel 22, the rotation of the reel shaft 2 is not transmitted to the reel 22. Consequently, the tape 23 is not rewound, and hence it is not likely to cut or get entangled.

With the present invention described above, an endless tape can be used with a usual cartridge-type tape recorder through the use of a cartridge of a simple construction, so that the endless tape or a usual tape can be selectively used at will with the cartridge-type tape recorder according to a user's particular purpose.

Further, with the provision of the auxiliary capstan and the auxiliary pinch roller, the load rendered to the capstan 4 and the pinch roller 5 of the tape recorder TC can be reduced to facilitate smooth tape drive during constant-speed tape drive for recording and reproducing and, in addition, during fast forwarding of the tape the tape drive can be achieved at high speed.

Since the cartridge 20 has the single aperture 44 for receiving the capstan 4 of the tape recorder TC only when the cartridge 20 is mounted on the tape recorder TC under normal conditions, the cartridge 20 cannot be loaded upside down on the tape recorder TC and accordingly no faulty operation occurs.

Moreover, the auxiliary capstan 26 and consequently its central aperture 33*b* is adapted to be movable in a plane crossing the axis of the reel 22 at substantially right angles thereto, so that even in the case where the cartridge loading portion 1 of the tape recorder TC is narrow and the mounting of the cartridge 20 on the cartridge loading portion 1 is not so easy, the engagement of the central aperture 33*b* of the auxiliary capstan 26 with the reel shaft 3 can be readily achieved.

As previously described, the auxiliary capstan 26 is adapted to be movable but the capstan 26 and the pinch roller 27 are provided on the common baseplate 28, so that they are always pressed against each other under a predetermined pressure. Consequently, even if the auxiliary capstan 26 is moved while being driven, the contact of the capstan 26 with the pinch roller 27 does not change at all times, so that the tape 23 can be smoothly driven without play therebetween and discomfortable noise generation.

Although the baseplate 28, the resilient arm 36, the semicircular portion 28A of the arm 36 and the sleeve 34 are formed integral by molding in the foregoing, the baseplate 28 and the semicircular portion 28A of the arm 36 may be mechanically coupled together. Further, the auxiliary pinch roller 27 may be biased to the pressed against the auxiliary capstan 26 not only by the arm 36 formed integral with the baseplate 28 but also by spring means especially provided on the baseplate 28 or on the semicircular portion extending therefrom.

It will be apparent that many modifications and variations may be effected without departing from the scope of the novel concepts of this invention.

We claim as our invention:

1. A cartridge for a tape machine having a capstan and a pair of drive shafts comprising:
   a. a cartridge casing formed with an opening through which said one of said drive shafts is receivable,
   b. a first hub rotatably mounted in said casing on the other of said drive shafts,
   c. an endless loop of tape wound on said first hub,
   d. a baseplate pivotally mounted in said casing,
   e. a second hub rotatably supported by said baseplate and formed with an opening through which said one shaft is receivable,
   f. an arm with one end attached to said baseplate,
   g. a roller mounted on the other end of said arm and said endless tape passing between said roller and second hub, and said cartridge formed with an opening for receiving said capstan to drive said tape.

2. A cartridge as claimed in claim 1 wherein said arm and said baseplate are pivotally mounted on a projection extending from said casing.

3. A tape cartridge as claimed in claim 2 wherein the arm is resilient, the baseplate and the resilient arm are formed integral with each other.

4. A cartridge as claimed in claim 1, including means for limiting the movement between said baseplate and said casing.

5. A tape cartridge as claimed in claim 1 wherein the casing has one opening for receiving a capstan, with said opening located off center of the center of the casing in its longitudinal direction.

6. A cartridge for a tape machine having a capstan and at least one drive shaft comprising:
   a. a cartridge casing formed with an opening through which said one drive shaft is receivable;
   b. a first hub rotatably mounted in said casing at a position laterally offset from said drive shaft;
   c. an endless loop of tape wound on said first hub;
   d. a second hub engaging said tape and loosely mounted in said casing and generally aligned with said opening to self-center so as to receive said one drive shaft; and
   e. a baseplate rotatably supporting said second hub and pivotally mounted in said cartridge.

7. A cartridge for a tape machine according to claim 6 comprising a roller mounted in said cartridge so that the tape passes between said roller and said second hub.

8. A cartridge for a tape machine according to claim 7 comprising a resilient arm supported at one end from said baseplate and rotatably supports said roller at its other end.

9. A cartridge for a tape machine according to claim 6 comprising means for limiting the motion of said baseplate relative to said cartridge.

10. A cartridge for a tape machine according to claim 9 wherein said limit means comprises a recess into which said baseplate loosely fits.

11. A cartridge for a tape machine according to claim 6 wherein said first hub has first and second concentric portions with the first portion rotatably supported by said second portion.

12. A cartridge according to claim 6 wherein said cartridge is formed with a capstan-receiving opening on only one side thereof.

* * * * *